(12) United States Patent
Kaufman

(10) Patent No.: US 11,481,831 B2
(45) Date of Patent: *Oct. 25, 2022

(54) SYSTEM AND METHOD FOR LOCATING IN-STORE PRODUCTS

(71) Applicant: Jacob Kaufman, West Bloomfield, MI (US)

(72) Inventor: Jacob Kaufman, West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,366

(22) Filed: May 5, 2020

(65) Prior Publication Data

US 2020/0265498 A1 Aug. 20, 2020

Related U.S. Application Data

(63) Continuation of application No. 15/680,630, filed on Aug. 18, 2017, now Pat. No. 10,679,275.

(Continued)

(51) Int. Cl.
*G06Q 30/06* (2012.01)
*G06K 7/14* (2006.01)

(52) U.S. Cl.
CPC ....... *G06Q 30/0633* (2013.01); *G06K 7/1413* (2013.01); *G06Q 30/0623* (2013.01)

(58) Field of Classification Search
CPC ......... G06Q 30/06333; G06Q 30/0641; G06K 7/1413

(Continued)

(56) References Cited

U.S. PATENT DOCUMENTS

2007/0288296 A1* 12/2007 Lewis .................... G06Q 30/02
186/52
2008/0270249 A1* 10/2008 Rosenbaum ....... G06Q 30/0239
705/26.1

(Continued)

FOREIGN PATENT DOCUMENTS

CA 2896815 A1 * 7/2014 ............. G06Q 10/02

OTHER PUBLICATIONS

Kawai, Naoya , "Construction of Overhead-View Images Using Single Camera at a Road Intersection"; Japan Traffic Management Technology Association ogawa@tokyo.tmt.or.jp Publication info:7th ITS World Congress, Busan, 2010:Proceedings: 9p.conference held from Oct. 25, 2010 to Oct. 29, 2010 retrieved from Dialog 06022022.*

*Primary Examiner* — Yogesh C Garg
(74) *Attorney, Agent, or Firm* — Law Offices of John G. Posa

(57) ABSTRACT

A mobile application ("app") enabling a shopper to identify an item or items that the user wishes to locate or purchase. The device displays a list of stores which stock the item(s), and a user is then provided with in-store guidance enabling the shopper to find the item or items that the user wishes to locate or purchase. A user can identify an item or items by scanning a product bar code, scanning a product label; capturing an image of a product, or typing a product name in a search field. The method further includes identifying stores that stock the item. Items can be added to an accumulative shopping list, and items may be ordered online if not available nearby. The system provides basic navigation to store(s) carrying the item(s). Once at a store, an interior route to a product is portrayed through an overhead view map of a store layout. Once near a product, a user may be shown a virtual display of a shelf with the vertical or height placement of the product on the nearby shelf.

16 Claims, 3 Drawing Sheets

Related U.S. Application Data

(60) Provisional application No. 62/376,999, filed on Aug. 19, 2016.

(58) Field of Classification Search
USPC .................................. 705/26.1, 26.61, 26.8
See application file for complete search history.

(56) References Cited

U.S. PATENT DOCUMENTS

| | | | |
|---|---|---|---|
| 2009/0172511 A1* | 7/2009 | Decherd | G06F 16/9537 |
| | | | 715/207 |
| 2013/0317950 A1* | 11/2013 | Abraham | G06Q 30/06 |
| | | | 705/27.1 |
| 2014/0324627 A1* | 10/2014 | Haver | G06Q 30/0273 |
| | | | 705/26.9 |
| 2015/0006321 A1* | 1/2015 | Cozad | G06Q 30/0639 |
| | | | 705/26.9 |
| 2016/0223339 A1* | 8/2016 | Pellow | G06Q 30/0639 |
| 2017/0032313 A1* | 2/2017 | McCullough | G06K 7/1413 |
| 2017/0161703 A1* | 6/2017 | Dodia | G06K 19/06028 |

* cited by examiner

SYSTEM AND METHOD FOR LOCATING IN-STORE PRODUCTS

REFERENCE TO RELATED APPLICATIONS

This application is a Continuation of U.S. patent application Ser. No. 15/680,630, filed Aug. 18, 2017, which claims priority to, and the benefit of, U.S. Provisional Patent Application Ser. No. 62/376,999, filed Aug. 19, 2016, the entire content of all Related Applications being incorporated herein by reference.

FIELD OF THE INVENTION

This invention resides in a mobile application that directs customers to a specific shelf location to find a desired item without the need for 3D scanning or geo-locating technologies.

BACKGROUND OF THE INVENTION

Unfortunately shopping can be a frustrating, unpleasant experience. Due to the plethora of competing products and the number of stores which might carry them, finding the right store(s) at the right price(s) can be challenging.

The current industry standard for retail stores is to place items based on bar-code UPC label on a shelf location, which also has a bar-code UPC label. For standard inventory tracking, each item is associated with a specific shelf placement. However, this system does not provide consumers with direct assistance, who just want to find what they are looking for.

Clearly any device or method that can assist shoppers would be of benefit to consumers.

SUMMARY OF THE INVENTION

This invention assists shoppers by providing a device and method of locating in-store products. The preferred embodiment resides in a portable electronic device with application software enabling a user to identify an item or items that the user wishes to locate or purchase. The device displays a list of stores which stock the item(s), and a user is then provided with in-store guidance enabling the shopper to find the item or items that the user wishes to locate or purchase.

A user can identify an item or items by scanning a product bar code, scanning a product label; capturing an image of a product, or typing a product name in a search field. The method further includes identifying stores that stock the item. Items can be added to an accumulative shopping list, and items may be ordered online if not available nearby.

The system provides basic navigation to store(s) carrying the item(s). Once at a store, an interior route to a product is portrayed through an overhead view map of a store layout. Once near a product, a user may be shown a virtual display of a shelf with the vertical or height placement of the product on the nearby shelf. If the customer has created a shopping list of items, the customer may be directed to the next nearest item on the list.

A store's layout may be created with 3D software once a store has created an online account, with the system and method further including the step of synchronizing the store's inventory with the online account for tracking of shelf placement locations.

DETAILED DESCRIPTION OF THE PREFERRED EMBODIMENTS

This invention resides in a mobile application that directs customers to a specific shelf location to find a desired item without the need for 3D scanning or geo-locating technologies. The solution integrates a retail location's existing shelving placement inventory system with an overall layout of the store's floor plan. The system and method, referred to herein as "StoreTrek," follows a device user within this layout and directs customers to a specific shelf location to find an item. This process is accomplished without any need for iBeacons, 3D scanning, or GPS technologies. Once a store layout is configured with a store manager, the software synchronizes with the layout database and coordinates with a hand-held device location to report product locations to the users.

The invention is preferably implemented as a software application ("app") used by customers to find products within a store via a virtual map of a store's interior. This is carried out by both encompassing an overhead overall layout as well as a horizontal shelf-by-shelf layout to vertically locate products within a particular height of a shelf placement.

StoreTrek is also used by store managers and/or stock managers to place and track inventory on shelves. Stores can use the software to place products within a specific grid vertically and horizontally on a virtual version of their store shelves.

The invention accomplishes these processes by utilizing the store's existing bar code stock systems and creating a virtual 3D layout version of the entire store that can be edited by store managers, even if shelves are moved or re-arranged at any time.

StoreTrek is to be offered to customers for free with advertisements included in the interface. Advertisements will offset the cost of development and operating expenses. A paid "pro" version will be offered for those customers who do not want to be bothered by advertisements. It is anticipated that store manager versions of the StoreTrek system will be "pro" versions and are included with a store's subscription account to the StoreTrek service and part of creating their virtual store account and inventory system.

There are three primary functions implemented by the StoreTrek system. First, a user identifies an item or items they wish to locate/purchase. Second, stores are presented that stock the identified item(s), and third, the user is provided in-store guidance to find the actual item or items they are looking for. Each one of these functions includes sub-functions to streamline the process overall.

For example, after opening the StoreTrek app, a user can search for products by:

Scanning the product bar code;
Scanning the product label;
Scanning the entire product itself; or
Typing the product name in a search field.

Figure 1:
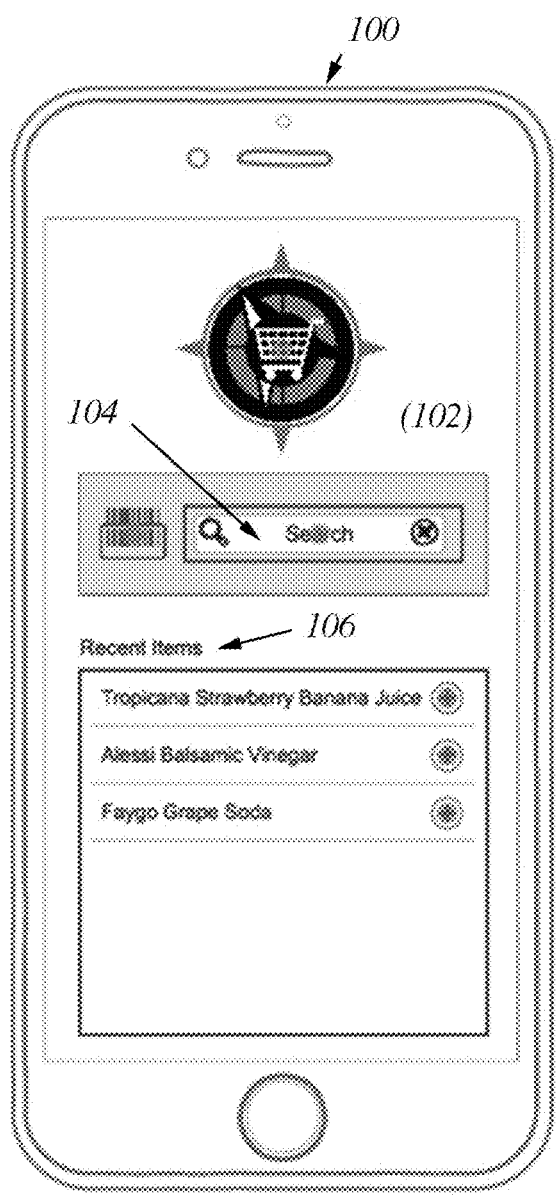
FIG. 1 depicts the options available to a user for searching goods.

FIG. 1 illustrates these options. Opening the application initiates three primary actions: (1) Launching of the device scanner and camera verified with windows such as window 102 for the scanner; (2) Providing a search field 104; and (3) Showing a listing of Recent Items enabling a user to replace items with new ones. Selecting a PLUS icon automatically adds the newly identified product to the list. Regardless of the search approach used, it is anticipated that a search will be conducted via an Internet connection prompted by the app to match the user input with a specific product. For example, if a product name is entered incorrectly in the search field, corrected results will be presented for clarification.

Figure 2:
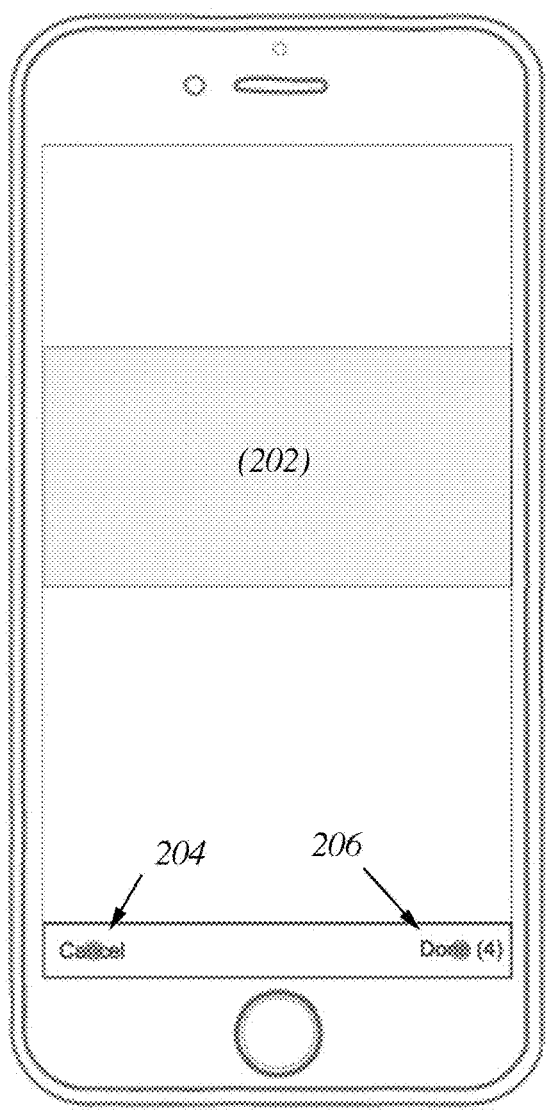
FIG. 2 illustrates a typical scanning process.
Figure 3:
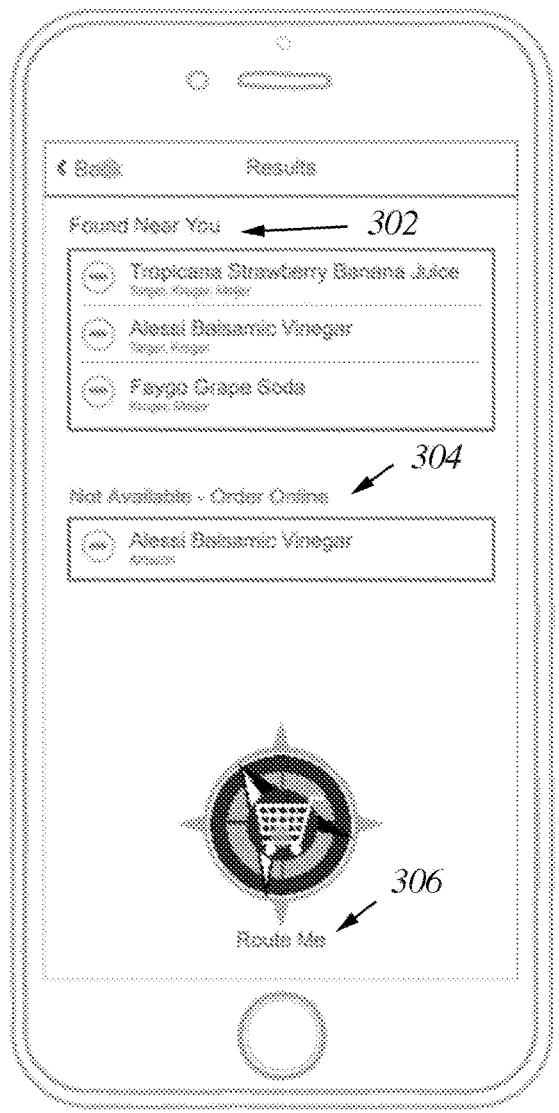
FIG. 3 depicts the results of a search.

FIG. 2 illustrates a typical scanning process. Area 202 shows the scanning process, with touch areas 204, 206 being used for DONE and CANCEL functions, respectively. Note that the label and products scans are nearly identical, except that area 202 shows the product or label being captured. Results of the search are shown as follows:

Nearby stores with product are shown
Products can be added to an accumulative shopping list
Ordered online if not available nearby FIG. 3 depicts the results of search. As can be seen, the app found various locations where three items 302 may be purchased, as well as an on-line option for an item 304 that could not be located nearby. After items are added to the Results list, the app automatically determines which nearby stores have the items in-stock. A Route Me action 306 acts upon the items in the Results list. Items not available are offered suggestions to affiliate locations such as Amazon (allowing further monetization).

Figure 4:
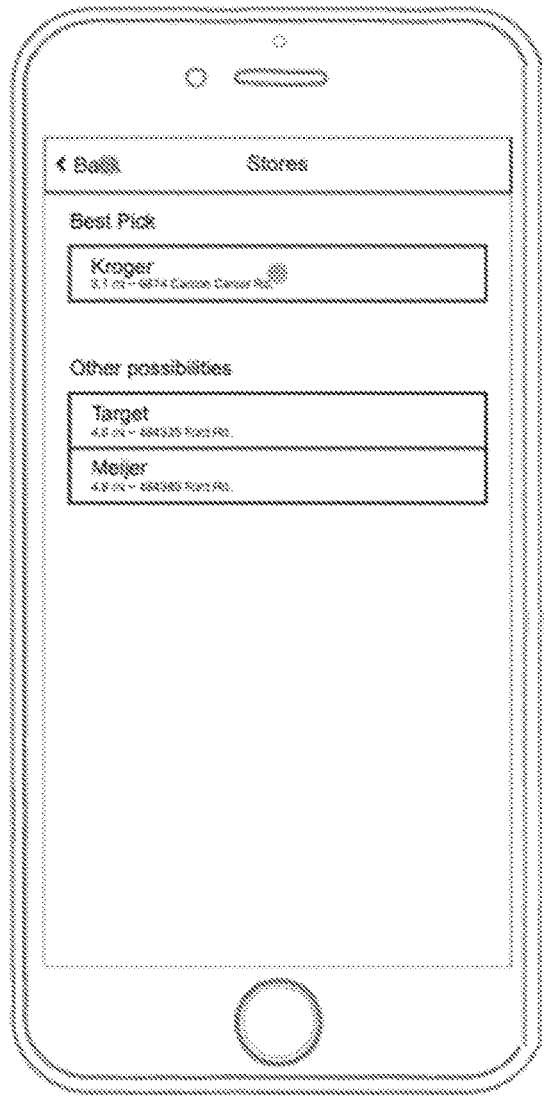
FIG. 4 shows how the application also provides best picks/sorting based upon various criteria, such as proximity, price, sales, discounts, etc.
Figure 5:
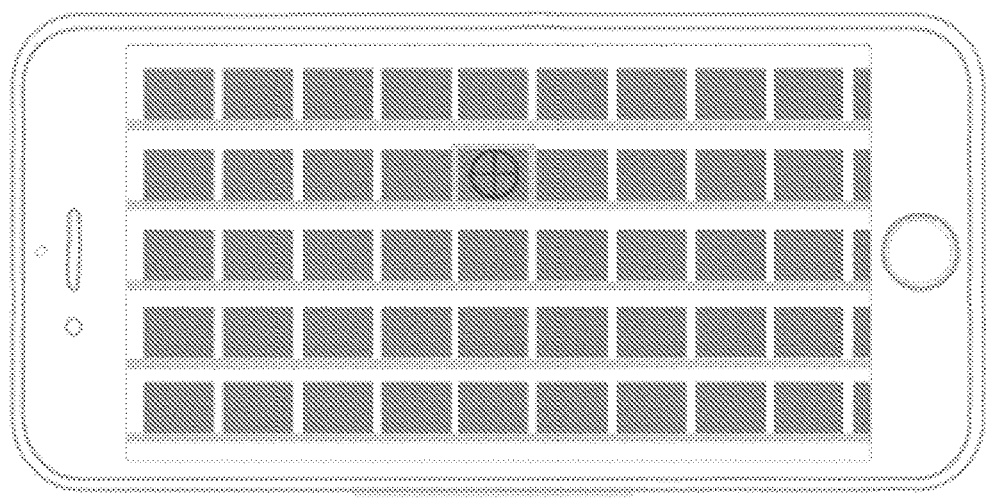
FIG. 5 illustrates how, once at the store, the interior route to a product is displayed via overhead view map of store layout.
Figure 6:
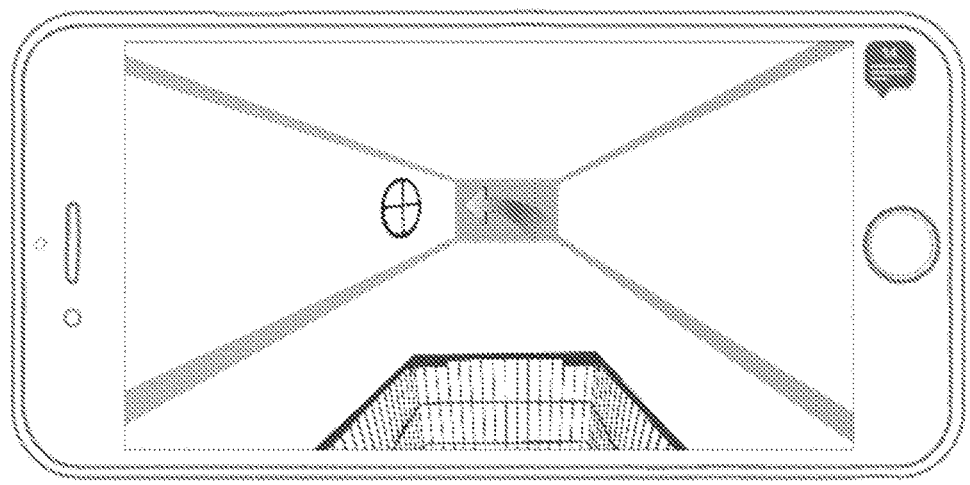
FIG. 6 depicts how, once near a product, the customer will be shown a virtual display of the shelf with the vertical or height placement of the product on the nearby shelf.
Figure 7:
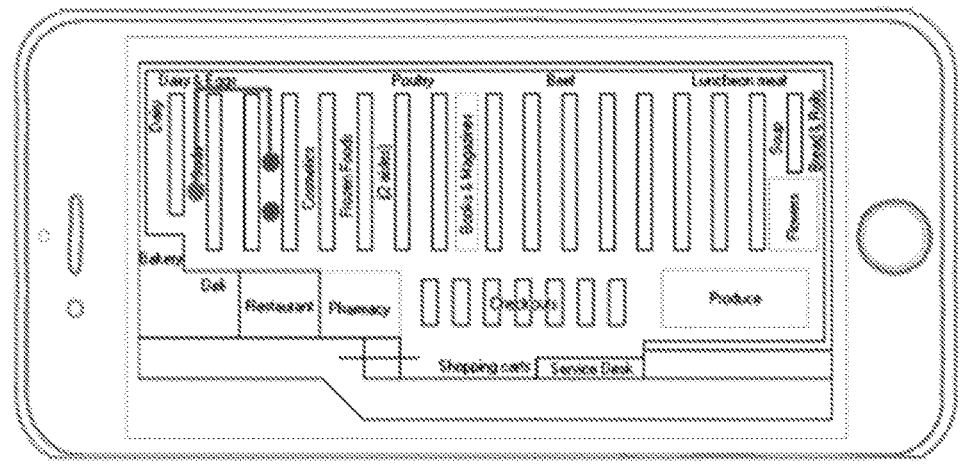
FIG. 7 shows how, once the customer has created a shopping list of items, they are directed to the next nearest item on the list.

As shown in FIG. 4, the app will also provide best picks/sorting based upon various criteria, such as proximity, price, sales, discounts, etc., enabling a user to select a desired store. As part of a purchasing decision, if a user selects "Route Me," various actions will be taken:

Basic navigation to the store is an option available
Once at the store, the interior route to a product is show via overhead view map of store layout (FIG. 5);
Once near a product the customer will be shown a virtual display (FIG. 6) of the shelf with the vertical or height placement of the product on the nearby shelf; and
If the customer has created a shopping list of items, they are then directed to the next nearest item on the list (FIG. 7).

Store Manager Experience:

A store's layout is created with 3D software once a store has created their online account and their inventory system is synchronized with this account for tracking of shelf placement locations.

Store managers orientate shelving units, end-cap shelves and various furniture objects to the proper orientation of their location in the real store.
All shelving units have grid sizes that are adjustable for various size product placements and can be edited for number of vertical shelves, horizontal length, vertical height and display angles.
All shelving grid placement areas are barcode specific and database registered with a store's account so they can be assigned a product
Store managers scan products into inventory as they normally would and subsequently scan a shelves bar code area for its placement—meanwhile, their StoreTrek account database is updated to synchronize the product placement into inventory with the shelf's placement.
Store managers can use the StoreTrek app via a mobile device to scan products into inventory or they can use their existing bar code inventory scanners. As an added benefit of using StoreTrek, our app will update to show them the product placement on the virtual shelf whereas their existing system will not.
Store managers can edit their layout, shelf placement and furniture displays at any time in the online account.
StoreTrek online account subscriptions can be fully integrated into a retailer's online presence, website and online store.
Product delivery services can easily take advantage of StoreTrek and retailers can integrate shopping services experiences for the "stay-at-home" shopper to shop for products virtually and then have everything delivered to their home.

Other options include mobile device location tracking within the store interior as well as integration with a store's wireless system for instant sales, marketing and other various retail applications. Ultimately the StoreTrek app will provide a full augmented-reality shopping experience while also benefiting stores with a state-of-the art inventory shelf placement tracking system that is both easy to use and can be utilized from any mobile device.

The invention claimed is:

1. A method of locating products, comprising the steps of:
providing a plurality of products with computer-readable product identification codes;
placing the products at particular locations within a store having a product inventory;
providing a first portable electronic device with application software enabling a user of the first portable electronic device to perform the following functions:
(a) scan the computer-readable codes to obtain information describing identifying the products; and
(b) enter the information describing identifying the products, and the placement of the products within the store, into the store's product inventory;
generating a virtual graphical layout of the store;
wherein the virtual graphical layout of the store includes an overhead view map and a vertical shelf or height placement of the scanned products within the store; and
providing a second portable electronic device with application software enabling a user of the second portable electronic device to perform the following functions:
(c) receive information sufficient to identify a product that a user wishes to locate or purchase; and
(d) display the virtual graphical layout of the store on the second portable electronic device, thereby enabling the user to locate the product within the store using the overhead view map and a vertical shelf or height placement of the scanned products within the store.

2. The method of claim 1, wherein the layout comprises a three-dimensional graphical layout including an overhead view map and plurality of shelves that show the vertical or height placement of products on the virtual shelves.

3. The method of claim 2, wherein the three-dimensional layout includes shelves with grids for product placement.

4. The method of claim 3, including grids of different sizes to accommodate the placement of products having different sizes.

5. The method of claim 4, including a step of editing the grid sizes with respect to the number of vertical shelves, horizontal shelf length, vertical shelf height, or display angle.

6. The method of claim 1, wherein the computer-readable product identification codes are bar codes.

7. The method of claim 6, wherein the first portable electronic device is a bar-code reader.

8. The method of claim 1, wherein the first portable electronic device is a smart phone.

9. The method of claim 1, wherein the second portable electronic device is a smart phone.

10. The method of claim 1, wherein step (c) includes the step of using the second portable electronic device to read a product label.

11. The method of claim 1, wherein step (c) includes the step of using the second portable electronic device to capture an image of a product.

12. The method of claim 1, wherein step (c) includes the step of entering a product name.

13. The method of claim 1, wherein:
the second portable electronic device is operative to generate a shopping list of different products that the user wishes to locate or purchase; and
step (d) includes displaying the locations of the different products in conjunction with the graphical layout of the store.

14. The method of claim 13, including the step of guiding a user to the locations of the different products within the store.

15. The method of claim 14, wherein the step of guiding the user to the locations of the different products within the store refers to the shopping list.

16. The method of claim 1, including the steps of:
providing shelves within the store with computer-readable codes; and
reading the codes when entering the information describing the products in step (b).

* * * * *